No. 784,125. PATENTED MAR. 7, 1905.
A. T. SANDEN.
GALVANIC BATTERY CELL.
APPLICATION FILED DEC. 15, 1904.

Witnesses
Inventor
ALBERT T. SANDEN

No. 784,125.   Patented March 7, 1905.

UNITED STATES PATENT OFFICE.

ALBERT T. SANDEN, OF NEW YORK, N. Y.

GALVANIC-BATTERY CELL.

SPECIFICATION forming part of Letters Patent No. 784,125, dated March 7, 1905.

Application filed December 15, 1904. Serial No. 236,937.

*To all whom it may concern:*

Be it known that I, ALBERT T. SANDEN, a citizen of the United States, residing in the borough of Manhattan, in the city, county, and State of New York, have invented certain new and useful Improvements in Galvanic-Battery Cells, of which the following is a specification.

My invention relates to cells such as are used in galvanic batteries, and particularly to the small cells that are used in batteries adapted to be applied to the person by means of a belt or the like. These cells consist ordinarily of copper and zinc elements separated and kept in action by a piece of felt or similar fabric moistened with acidulated water. It is necessary that these shall be compact and particularly that they shall be flat, so as not to make the plate unnecessarily thick or clumsy.

Figure 1:
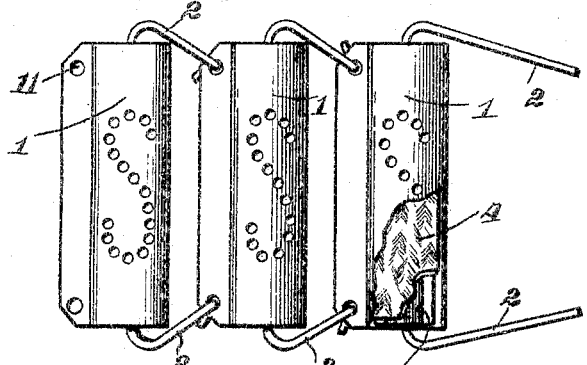
Figure 2:
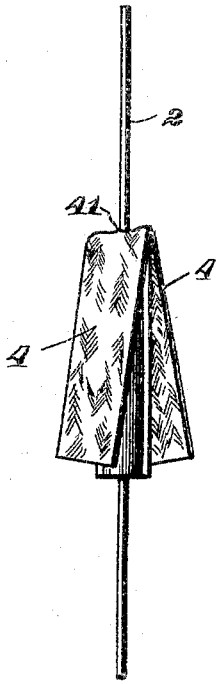
Figure 3:
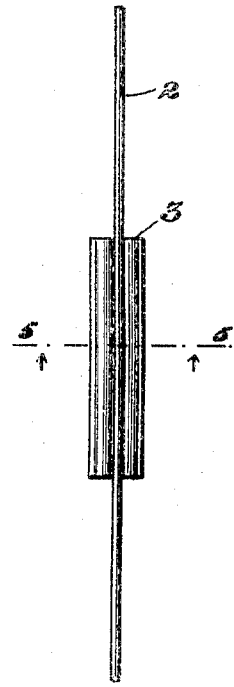
Figure 4:
Figure 5:
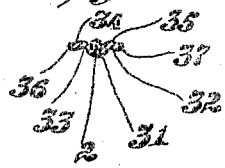

In the drawings, Figure 1 represents three of the cells connected together in series. Fig. 2 represents the zinc element and the porous separating portion before they are connected to the copper element. Figs. 3 and 4 are obverse and reverse views of the zinc element and its connecting-wires detached. Fig. 5 is a transverse section through line 5 5, Fig. 3.

As shown, the copper element of the cell consists of a sheet or plate of copper so folded as to bring its edges together and to give it a cross-sectional contour of ovoid form. In the corners are pierced apertures 11, adapted to receive the ends of a connecting-wire 2, the metal portion of which is securely attached, as by soldering, to the zinc element 3 of the cell. As shown, the wires 2 are secured to the zinc plate 3, so as to extend therebeyond at both ends, and a strip 4 of felt or similar fabric is pierced at its middle point 41 and threaded over the wire 2. These portions shown in Fig. 2 are then slipped within the copper element 1 and the ends of the wires 2 bent to enter the apertures 11 of the next cell or in the case of the end cell to engage with a suitable current-conveying device. Cells of this general construction have been made; but heretofore the zinc element has been either in a substantially cylindric form or else has been a flat plate. In the one case two narrow lines of contact were formed between the opposite sides of the cylinder and the felt against which it is pressed. In the case of the flat square plate it is sometimes possible that four such lines of contact may be formed; but they are necessarily very imperfect and unsatisfactory.

My invention consists in making the zinc element of a much thicker metal than heretofore has been employed and of corrugating it, preferably longitudinally, as shown in the drawings. I have shown the plate as provided with a groove 31 in its median line, in which the conducting-wire is secured, and with two grooves 32, one at each side of this median line, but on the opposite side of the plate. In this way at least five points of contact with the felt or fabric 4, caused by the pressure thereon of the copper element 1, are formed. These are numbered, respectively, 33, 34, 35, 36, and 37. It will be noted that the lines 33, 34, and 35 are of a low curvature, so as to almost coincide with the curve of the sides of the element 1, so that not only will a large number of contact-lines be formed, but several of these will be of substantial width.

Another and perhaps the principal advantage of my invention lies in the fact that practically capillary tubes are formed between the felt and the curved or transversely-waved surfaces of the corrugated zinc plate. As these groups of elements are usually brought into renewed action by dipping them in acidulated water and shaking off the excess, it is important that they should retain a considerable quantity of water without increasing the resistance by reason of the thickness of the porous element. My device provides for a flat porous element consisting of a relatively thick zinc plate with large contact and at the same time for a great increase in its capillary capacity.

It is evident that any changes of form are possible without departing from the spirit of my invention.

Having thus described my invention, what I claim, and desire to secure by Letters Patent, is—

1. A battery comprising a folded outer element, an intermediate porous fabric portion in contact with the inner side of said outer element, and a grooved inner element providing on both of its faces a plurality of lines of contact with said fabric portion and a plurality of capillary spaces therebetween.

2. A battery comprising a folded outer element, an intermediate porous fabric portion in contact with the inner side of said outer element, and a longitudinally-grooved inner element consisting of a plate formed with shallow transverse waves providing a plurality of lines of contact with said fabric portion and a plurality of capillary spaces therebetween.

3. A battery comprising a thin outer folded plate of copper, an intermediate porous fabric portion in contact with the inner side of said copper element, and a longitudinally-grooved zinc plate having a series of shallow transverse waves extending approximately from edge to edge thereof forming the inner element, whereby a plurality of lines of contact and of capillary lines is formed between said zinc element and said fabric portion.

4. In a galvanic battery, a zinc element consisting of a plate transversely waved approximately from edge to edge thereof, thereby forming a plurality of longitudinal grooves in its opposite faces, and a conducting-wire secured in one of said grooves.

In testimony whereof I have signed this specification in the presence of two subscribing witnesses.

ALBERT T. SANDEN.

Witnesses:
   G. H. McIvor,
   C. H. Williams.